United States Patent Office 3,840,503
Patented Oct. 8, 1974

---

3,840,503
CATALYST USEFUL FOR THE EPISULPHIDE POLYMERIZATION AND COPOLYMERIZATION AND PROCESS EMPLOYING SAID CATALYSTS
Arnaldo Roggero, Alessandro Mazzei, and Antonio Proni, San Donato Milanese, Italy, assignors to Snam Progetti, San Donato Milanese, Italy
No Drawing. Filed July 31, 1972, Ser. No. 276,464
Claims priority, application Italy, July 31, 1972, 27,019/72
Int. Cl. C08g 23/00
U.S. Cl. 260—79    4 Claims

ABSTRACT OF THE DISCLOSURE

Episulphides, such as ethylenesulphide, propylene sulphide and allyloxy-2,3-epithiopropane, are homo- or copolymerized to provide polymers of high molecular weight by reacting the monomers in the presence of a new catalyst consisting of a particular hydride and co-catalyst consisting of a particular polyreactive compound.

The hydride is a simple or substituted aluminum hydride or a mixed hydride of two elements: The aluminum hydride is represented by the formula:

AlHXY·Z wherein X and Y, which may be the same or different, are members of the group consisting of hydrogen, halogen and residues of aliphatic or aromatic amines; Z is a Lewis base selected from ethers and amines and can be absent when X and/or Y is a secondary amine radical. The mixed hydride is represented by the formula:

MeMe'H$_{4n}$ wherein Me' is a member of the group consisting of Al, B and Ga; Me is an element of Groups I, II and III of the Periodic Table; and $n$ is 1–3.

The polyreactive compound contains at least one of:
(a) two active hydrogens, (b) an active hydrogen and one of the groups: C=O, N=O, S=O, P=O, C=S, P=S, C≡N; (c) two of the groups: P=O, P—N, C=O, N=O, S=O, C=S, P=S, C≡N and N=S; (d) the group —N=N—.

---

The present invention relates to new catalysts useful for the polymerization and copolymerization of episulphides as well as the polymerization process employing said catalysts.

More particularly it is an object of the present invention to provide an episulphide polymerization process, employing as catalyst aluminium hydrides or mixed hydrides of two elements together with particular co-catalysts.

We have now found that it is possible to produce episulphide polymers having a high molecular weight using catalysts selected from the class of simple or substituted aluminium hydrides of the general formula:

AlHXY·Z wherein X and Y, which may be the same or different are selected from hydrogen, halogens and residues of aliphatic or aromatic secondary amines and Z is a Lewis base selected from ethers and amines; the latter can be absent when X and/or Y represent a secondary amine radical.

The mixed hydrides can be described by the following general formula:

MeMe'H$_{4n}$ 

wherein Me' is selected from Al, B, Ga and Me represents an element of the I, II and III Groups of the Periodic Table of the elements and $n$ is a number comprised between 1 and 3.

Examples of aluminium hydride are: aluminium trihydride complexed with ethers and amines, aluminium mono and dichlorohydride, aluminium dimethylamino dihydride, aluminium piperidino dihydride and the like.

Examples of mixed hydrides are: lithium aluminium hydride, sodium aluminium hydride, potassium aluminium hydride, rubidium aluminium hydride, cesium aluminium hydride, calcium aluminium hydride, magnesium aluminium hydride, beryllium aluminium hydride, strontium aluminium hydride, barium aluminium hydride, boron aluminium hydride, lithium borohydride, sodium borohydride, lithium gallium hydride and the like.

To prepare the catalyst one of the above hydrides is reacted with a compound comprising:
(a) at least two active hydrogens (i.e. hydrogen atoms which can be replaced by metal atoms),
(b) an active hydrogen and a group selected from: C=O, N=O, S=O, P=O, C=S, P=S, C≡N,
(c) at least two groups selected from PO, P—N, C=O, N=O, S=O, C=S, P=S, C≡N, and N=S,
(d) at least a group —N=N—.

Examples of the above compounds are: dimercaptans, like 1,6-hexane dithiol; sulphoxides, like dimethylsulfoxide; sulphones like dimethylsulphone; oximes like diacetylmonoxime; nitro- or nitroso-derivatives like nitrobenzene, nitromethane; phosphoramides like hexamethylphosphoramide and so on. The amount of said compounds mixed with the particular hydride depends on the nature of the compound, on the nature of the hydride, on the type of solvent, on the temperature and on the employed episulphide. Any suitable procedure can be employed to carry out the reaction. Preferably the hydride compound is added to the cocatalytic compound in a suitable solvent selected from aromatic, aliphatic, cycloaliphatic hydrocarbons, cyclic or linear ethers or other solvents of polar nature. In some cases the cocatalytic compound itself can act as a solvent.

The reaction products can be used as they are or after a heat treatment. The polymerization temperature may vary from −80° C. to +150° C. and preferably from −30° C. to 70° C.

The amount of catalyst can be from 0.01% to 10% and preferably from 0.1% to 5% with respect to the weight of monomer or monomers which are being fed. Specific examples of episulphides which can be homo- or copolymerized are: ethylene sulphide, propylene sulphide, isobutylene sulphide, styrene sulphide, butadiene monosulphide, allyloxy 2,3-epithiopropane and the like.

The invention will be better understood by reference to the following examples, herewith reported to illustrate the scope without being limitative thereof.

EXAMPLE 1

In a bottle of 250 cm.³ capacity, after the air is removed, 40 cm.³ of a catalytic solution was introduced. The solution were prepared in this manner: 0.63 mmoles of AlH$_3$·N(CH$_3$)$_3$ were dropped in 40 cm.³ of hexamethylphosphoramide (HEMPA), and heated for 1 h. at 60° C. to remove the effluent gases. The bottle was cooled at −15° C. and, finally, 127 mmoles of propylene sulphide (PS) were slowly added thereto. The test was carried out in a 0° C. thermostatically controlled bath.

At the end of the reaction the polymer was coagulated in methanol and dried in a vacuum oven for 20 h. at 40° C.

9.4 g. of product were isolated (100% of conversion) having [η] in toluene at 30° C. of 0.73 dl./g.

EXAMPLE 2

The preceding example was repeated with the only difference that AlH$_3$·N(CH$_3$)$_3$ (1.27 mmoles) was reacted with dimethylsulphoxide (40 cm.³). The test was carried out at room temperature for 24 h. 8.6 g. of product (91.4%) was isolated having [η] in toluene at 30° C. of 1.46 dl./g.

EXAMPLE 3

The catalyst was prepared by reacting at 65° C. for 1 h. 5.7 mmoles of AlH₃·N(CH₃)₃ with 5.7 mmoles of diacetylmonoxime (DMO) in 40 cm.³ of toluene. The effluent gases were completely removed and 127 mmoles of PS were polymerized at 70° C. At the end of the experiment 6.6 g. (70% conversion) of polymer were isolated having [η] in toluene at 30° C. equal to 0.407 dl./g.

EXAMPLE 4

127 mmoles of PS were polymerized by using the catalyst system AlH₃·NMe₃ (1.27 mmoles)-HEMPA (6.35 mmoles) aged in tetrahydrofurane (THF) (40 cm.³) for 1 h. at 60° C. The polymerization was carried out at 0° C. for 16 h. 8.6 g. (91.5% conversion) of polymer were isolated having [η] in toluene at 30° C. of 0.92 dl./g.

EXAMPLE 5

The interaction product of AlH₃·N(CH₃)₃ (1.27 mmoles) and nitrobenzene (1.27 mmoles) was employed as a catalyst system which has been treated for 1 h. at 70° C. in 40 cm.³ of toluene. The toluene removed under vacuum and the mixture was treated with 40 cm.³ of DMSO carrying out the polymerization of 127 mmoles of PS at 50° C. for 24 h. 9.3 g. (99% of conversion) were obtained having [η] in toluene at 30° C. of 1.53 dl./g.

EXAMPLE 6

The catalyst system obtained by reacting 2.54 mmoles of AlH₂N(CH₃)₂ and 2.54 mmoles of diacetylmonoxime (DMO) treated in toluene (40 cm.³) at 65° C. for 1 h. was employed. The toluene was removed by vacuum distillation and the product was treated with DMSO (40 cm.³).
The polymerization of 127 mmoles of PS was carried out at 50° C. for 24 h. 5.9 g. of polymer (63% of conversion) were obtained having [η] in toluene at 30° C. of 0.25 dl./g.

EXAMPLE 7

127 mmoles of PS were polymerized using as a catalyst system AlH₂N(CH₃)₂ (1.27 mmoles) in 40 cm.³ of DMSO.
The polymerization was carried out at room temperature for 24 h. and 8 g. of polymer (85% of conversion) were obtained having [η] in toluene at 30° C. of 0.25 dl./g.

EXAMPLE 8

127 mmoles of PS were polymerized with the

Ca(AlH₄)₂

(1.27 mmoles) and HEMPA (19.05 mmoles) catalyst system in THF (40 cm.³). The polymerization was carried out at 0° C. for 16 h. and 9.2 g. of polymer (98% conversion) were obtained having [η] in toluene at 30° C. of 0.41 dl./g.

EXAMPLE 9

LiAlH₄ (0.8 mmoles) in HEMPA (40 cm.³) was used as catalyst system. The polymerization of 127 mmoles of propylene sulphide was carried out at room temperature for 24 h. 9.4 g. of polymer (100% conversion) having [η] in toluene at 30° C. of 0.54 dl./g. were obtained.

EXAMPLE 10

The preceding test was repeated using in the place of HEMPA the DMSO (40 cm.³). 6.0 g. of polymer (73% of conversion) were obtained having [η] in toluene at 30° C. of 0.59 dl./g.

EXAMPLE 11

The catalyst system NaBH₄ (0.5 mmoles) in HEMPA (40 cm.³) was used. The polymerization of 127 mmoles of PS was carried out at room temperature for 20 h. and 9 g. of polymer (96% of conversion) were obtained having [η] in toluene at 30° C. of 1.09 dl./g.

EXAMPLE 12

142 mmoles of PS and 16 mmoles of allyloxy-2,3 epithiopropane were polymerized using as a catalyst system AlH₃·N(CH₃)₃ (1.27 mmoles) in DMSO (40 cm.³). After 24 h. at room temperature 10.5 g. of copolymer (83.5% conversion) were obtained having [η] in toluene at 30° C. of 0.74 dl./g.

The copolymer was vulcanized at 145° C. for 2 h. using the following recipe:

| | Parts |
|---|---|
| Polymer | 100 |
| ZnO | 5 |
| Mercaptobenzothiazole | 1 |
| Tetramethylthiurame disulphide | 2 |
| Sulphur | 2 |
| Stearic acid | 0.5 |

The technological data are the following:

| | Polymer as it is | Vulcanized polymer |
|---|---|---|
| Modulus of elasticity 100% (kg./cm.²) | 0.64 | 12.4 |
| Tensile strength (kg./cm.²) | 0.20 | 14.0 |
| Elongation at break (percent) | 735 | 135 |
| Permanent set | 167 | 4 |

EXAMPLE 13

142 mmoles of PS and 50 mmoles of ethylene sulphide (ES) were copolymerized using AlH₃·N(CH₃)₃ (1.27 mmoles) in DMSO (40 cm.³). After 24 h. at room temperature 12.3 g. of copolymer was isolated (91.2% conversion) having [η] in toluene at 30° C. of 0.42 dl./g.

EXAMPLE 14

142 mmoles of PS, 50 mmoles of ES and 13.7 mmoles of allyloxy-2,3-epithiopropane were terpolymerized using AlH₃·N(CH₃)₃ (1.27 mmoles) in DMSO (40 cm.³). After 24 h. at room temperature 14 g. of terpolymer (91.6% of conversion) were isolated having [η] in toluene at 30° C. of 0.3 dl./g.

The product was vulcanized using the recipe described on Example 12 and the technological data of the vulcanized terpolymer were Modulus of elasticity 100% (kg./cm.²)=10.7
Tensile strength (kg./cm.²)=12.5
Elongation at break (percent) 140
Permanent set (percent) 0

What is claimed is:
1. Process for the preparation of episulphide polymers wherein an episulphide monomer is contacted, at a temperature in the range of −80 to 150° C. with a catalyst-cocatalyst reaction product wherein:
the catalyst is a member of the group consisting of (1) aluminum hydrides represented by the formula:

AlHXY·Z wherein X and Y, the same or different, are selected from hydrogen, halogens and residues of aliphatic or aromatic secondary amines and Z is a Lewis base selected from ethers and amines which may be absent when X and/or Y represent a secondary amine residue; and (2) mixed hydrides represented by the formula:

Me[Me'H₄]ₙ wherein Me' is a member of the group consisting of Al, B and Ga, Me is a member of the group consisting of Li, Na, K, Rb. Cs, Ca, Mg, Be, Sr and Ba, and n is 1 to 3;

the cocatalyst is a polyreactive compound selected from the group consisting of sulphoxides, sulphones, oximes, nitro- or nitroso-derivatives of alkyl or aryl hydrocarbons, phosphoramides, and containing
(a) at least two active hydrogens;
(b) an active hydrogen and a group represented by C=O, N=O, S=O, P=O, C=S, P=S and C≡N;
(c) at least two groups selected from P=O, P=N, C=O, N=O, S=O, C=S, P=S, C≡N and N=S;
(d) at least one group represented by N=N—.

2. Process for the preparation of episulphide polymers according to claim 1 characterized in that said episulphide monomer is accompanied by another episulphide monomer.

3. Process according to claim 1 characterized in that the cocatalyst is selected from the group consisting of hexamethylphosphoramide, dimethylsulphoxide, diacetylmonoxime and nitrobenzene.

4. Process according to claim 1 characterized in that the polymerization reaction is carried out in the presence of an amount of catalyst in the range 0.01% to 10% by weight with respect to the weight of the added monmer.

References Cited
UNITED STATES PATENTS

| | | | |
|---|---|---|---|
| 3,324,051 | 6/1967 | Lal | 260—79.7 |
| 3,345,308 | 10/1967 | Lal | 260—79.7 |
| 3,542,698 | 11/1970 | Lal | 260—79.7 |
| 3,645,986 | 2/1972 | Rifi | 260—79 |

MELVYN I. MARQUIS, Primary Examiner

U.S. Cl. X.R.

260—79.1, 79.7